Oct. 2, 1951  C. KAPPES  2,569,813
CENTRIFUGAL JUICE EXTRACTOR
Filed Aug. 25, 1949

Clarence Kappes
INVENTOR.

Patented Oct. 2, 1951

2,569,813

UNITED STATES PATENT OFFICE 2,569,813

CENTRIFUGAL JUICE EXTRACTOR

Clarence Kappes, Rock Island, Ill.

Application August 25, 1949, Serial No. 112,372

2 Claims. (Cl. 210—63)

The present invention relates to new and usefull improvements in juice extractors and more particularly to a centrifugal juice extractor constructed for attaching to the spinner of a washing machine.

An important object of this invention is to provide a centrifugally operated juice extractor which may be easily and quickly installed in position in a washing machine and held in the rotary spinner of the machine without necessitating any changes or alterations in the construction thereof to utilize the rotary movement of the spinner for rotating the juice extractor.

A still further object is to provide an attachment of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
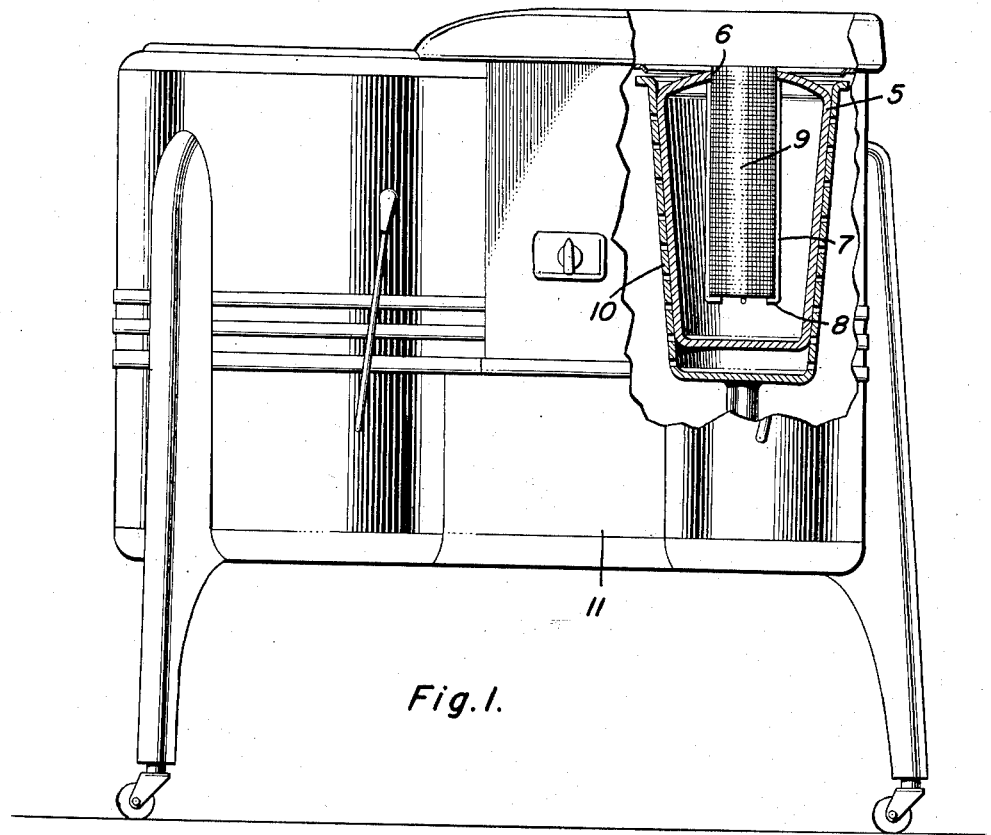
Figure 1 is a side elevational view of a washing machine showing the juice extractor mounted in position in the spinner thereof and with parts broken away and shown in section.
Figure 2:
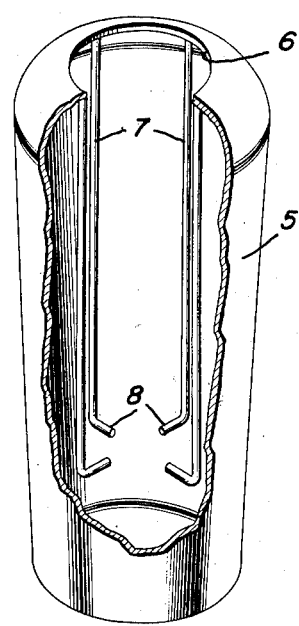
Figure 2 is an enlarged perspective view of the container for the juice extractor and with parts broken away and shown in section.
Figure 3:
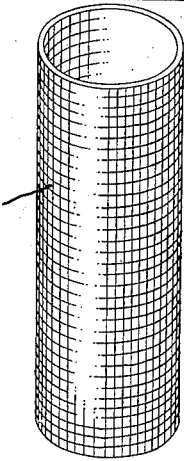
Figure 3 is a perspective view of the wire mesh cylinder supported in the container.

Referring now to the drawing in detail wherein for the purpose of illustration I have disclosed a preferred embodiment of the invention, the numeral 5 designates the container having a central opening 6 in its top and a plurality of rods 7 suitably secured to the underside of the top of the container and extending downwardly therein in spaced relation from the sides of the container and with the lower ends of the rods formed with inwardly projecting horizontal supporting arms 8.

A wire mesh cylinder 9 is closed at its bottom and is closely fitted in the opening 6 in the top of container 5 and with the bottom of the cylinder supported on the arms 8 and of hanger rods 7, to support the cylinder 9 in an elevated position in the container and spaced from the side walls thereof.

The container 5 is tapered toward its lower end to snugly fit in the complementary shaped spinning chamber 10 of a conventional type of clothes washing machine 11 to provide a friction drive for container 5 with the spinning chamber.

In the operation of the device, the container 5 with the cylinder 9 supported therein in the manner indicated in Figure 1 of the drawing, is placed in the spinner chamber 10 of the washing machine for rotation of the container with the spinner.

Fruit, from which juice is to be extracted, is placed in the cylinder 9 and a rapid rotation of the container 5 will cause a separation of the juice from the fruit by centrifugal action, the juice being collected in the container 5 while the solid substances are retained in the cylinder 9.

In the view of the foregoing description taken in conjunction with the accompanying drawing it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having thus described the invention, what is claimed as new is:

1. In a power operated machine including a spinning chamber, and a centrifugal juice extractor positioned in the chamber for rotation therewith and comprising a container having a friction driving engagement with the chamber, a cage in the container, and a foraminous cylinder supported in the cage for rotation with the container.

2. In a power operated machine including a tapered spinning chamber, and a centrifugal juice extractor positioned in the chamber for rotation therewith and comprising a tapered container frictionally fitted in the chamber, and having a centrally apertured integral top, a plurality of hanger rods depending from said top in the container, supporting separated arms at the lower ends of the rods, and a foraminous cylinder fitted in said opening and supported on said arms between the rods for rotation with the container.

CLARENCE KAPPES.

REFERENCES CITED

The following references are of record in the file of this patent:

UNITED STATES PATENTS

| Number | Name | Date |
|---|---|---|
| 1,471,614 | La Duke | Oct. 23, 1923 |
| 1,885,876 | Tulloch | Nov. 1, 1932 |
| 2,421,252 | Dunham | May 27, 1947 |